3,129,244
METHOD OF SEPARATING NAPHTHOIC ACID ISOMERS

Thomas F. Johnson, Penn Hills, Pa., assignor to United States Steel Corporation, a corporation of New Jersey
No Drawing. Filed Oct. 5, 1961, Ser. No. 143,058
5 Claims. (Cl. 260—525)

The present invention relates to a method of separating individual naphtholic acid isomers from admixtures containing them.

A coal tar may be treated to separate a fraction containing the isomeric alpha- and beta-monomethylnaphthalenes. When this fraction undergoes a metal-catalyzed, liquid-phase oxidation, there results an admixture containing alpha- and beta-naphthoic acids. An object of this invention is to provide a method for separating naphthoic acids from non-acids and also for recovering these acids as individual products. This separation represents a more feasible method than separating the monomethylnaphthalene isomers prior to oxidation.

A further object of the invention is a method of separating alpha-naphthoic acid from beta-naphthoic acid in admixtures thereof.

This invention is based on my discovery that when naphthoic-acid isomers in admixture are converted to alkali-metal naphthoates, the alpha-naphthoate is relatively more soluble than the beta-naphthoate in concentrated aqueous solutions of alkali-metal hydroxides, alkali-metal salts or in admixtures thereof.

It is known that alpha-calcium naphthoate has an appreciable water solubility, whereas the beta-calcium salt is insoluble in water. Although this technique is useful as a laboratory procedure, it is commercially impractical because the limited solubility of alpha-calcium naphthoate would involve unduly large volumes of water for processing. Furthermore, beta-calcium naphthoate is insoluble in all normal solvents, and subsequent purification and recovery of this isomer would entail additional processing steps. It is also known that alpha-copper naphthoate is soluble and beta-copper naphthoate is insoluble in alcohol, but this solvent is relatively expensive and highly inflammable. Such method, furthermore, requires additional processing steps and safety measures to protect personnel and equipment from the fire hazard.

To anyone skilled in the art, a sodium-hydroxide solution would be the logical choice as a medium for recovering and purifying an organic-acid product from a reaction mixture containing neutral by-products and/or unreacted starting material. It should be pointed out that preparations of sodium and potassium salts of naphthoic acids have been reported by previous workers. However, they apparently did not discover the insolubility of the beta-salts in concentrated aqueous solutions of alkali-metal hydroxides, alkali-metal salts or in admixtures thereof. My procedure differs from the prior practice in at least two ways: first, only water-soluble naphthoate salts are prepared as intermediates; and second, only one extra processing step, filtration, is required. The water solubility of the intermediate salts facilitates handling, and further processing. In industrial practice, the filtration step is a simple and inexpensive operation.

When dealing with an admixture of naphthoic acid isomers per se or an admixture of the isomers with other products, the first step according to my invention is to convert the mixed acids to mixed alkali-metal naphthoates. This conversion may take place by stirring or otherwise contacting the mixed acid isomers in an aqueous solution of an alkali-metal hydroxide such as sodium hydroxide, an alkali-metal salt such as sodium bicarbonate or in admixtures thereof. In dilute solutions on the order of 1% or 2% by weight of hydroxide or salt in the solution, the resulting alpha- and beta-naphthoates of alkali metals are completely soluble. When the chosen solute material exceeds about 3% by weight in the solution, however, the alpha-naphthoate will be soluble but the beta-naphthoate may not be completely soluble. The concentration of hydroxide or salt in the solution wherein beta-naphthoate will not dissolve completely, depends on the chosen hydroxide or salt.

The exact concentration of any solute material or admixture of solute materials at which beta-naphthoate is no longer completely soluble may be easily determined. Regardless of this minimum concentration, I have discovered that with increase in the concentration of solute material thereabove, beta-naphthoate becomes progressively less soluble in the hydroxide or salt solution and may be separated as precipitate from soluble alpha-naphthoate and remaining soluble beta-naphthoate. Thus, for example, where a mixture of the acid isomers is stirred in a 10% by weight sodium-hydroxide solution, a portion of the available beta-naphthoic acid is precipitated as beta-sodium naphthoate and may be recovered, as will be described hereinafter, as substantially pure beta-naphthoic acid. The remainder of the available beta-naphthoic acid and substantially all of the available alpha-naphthoic acid remain dissolved as the respective naphthoates. When the mixed acid isomers are stirred in a 20% by weight sodium-hydroxide solution, however, substantially all of the beta-sodium naphthoate precipitates. Substantially pure alpha- and beta-naphthoic acids may be separately recovered. It is also possible to achieve this latter result where a 10% by weight sodium-hydroxide solution containing beta-sodium naphthoate has added thereto with continuous stirring, sufficient sodium-hydroxide pellets to raise the sodium-hydroxide concentration from 10% to 20% by weight of the solution. During this operation, the remaining available beta-sodium naphthoate gradually precipitates.

Just as the minimum concentration of solute material to completely dissolve beta-naphthoate varies with the choice of solute material, so varies the maximum concentration that will substantially completely precipitate beta-naphthoate. Whereas for sodium hydroxide this concentration is about 20% by weight, the corresponding concentration for potassium hydroxide is about 30% by weight. As the solute material concentration approaches saturation in any solution, alpha-naphthoate becomes progressively less soluble also. With increase in concentration, alpha-naphthoate progressively precipitates with the previously precipitated beta-naphthoate. Thus, with about 42% potassium hydroxide by weight substantially none of the alpha-naphthoate remains in solution.

According to my invention, I may also use alkali-metal salts that do not convert naphthoic-acid isomers to naphthoates. These salts, in concentrated aqueous solutions, selectively precipitate beta-naphthoate from a mixture of alpha- and beta-naphthoates, or selectively dissolve alpha-naphthoate from such a mixture. For example, alkali-metal halides may be so used. Where acid isomers are to be separated, they may be stirred in a naphthoate-converter solution in admixture with a non-naphthoate converter, alkali-metal salt solution. For example, an alkaline brine solution containing a low concentration of sodium hydroxide and a high concentration of sodium chloride is effective in my process to separate the mixed acid isomers substantially completely.

An admixture of naphthoic-acid isomers per se or in an admixture with other products may be stirred in a solution of the chosen material until naphthoate conversion is substantially complete, usually for about 20 to 30 minutes. The stirred mixture may then be filtered and the precipitated beta-naphthoate filter cake washed with portions of fresh solution, which is added to the original filtrate containing the alpha-naphthoate. The filter cake may then be treated or washed with water to dissolve the water-soluble beta-naphthoate. Other products or impurities that are not water-soluble remain as filter-cake residue and are thus separated from the beta-naphthoate filtrate. Further removal of impurities may be effected by washing the separate filtrates of alpha-naphthoate and beta-naphthoate with selected solvents, for example, benzene, and then decanting. The two washed aqueous solutions may then be acidified, preferably with a strong mineral acid, to precipitate the separated alpha- and beta-naphthoic acids which are recovered by filtration.

A complete understanding of the invention may be obtained from the following typical examples showing how naphthoic-acid isomers may be separately recovered from admixtures containing them.

*Example 1*

A naphthoic-acid product was recovered from a prior oxidation of a coal-tar fraction comprising alpha- and beta-methylnaphthalenes. The crude product weighed 21.62 g. and, by titration of an aliquot, was found to contain 16.73 g. of naphthoic acids. Of the remaining crude product, 16.84 g. was stirred for 30 minutes in 200 ml. of an aqueous solution containing 20 weight percent of sodium hydroxide, and was then filtered. The precipitate, comprising mainly caustic-insoluble beta-sodium naphthoate, was washed on the filter with an additional 200 ml. of 20 percent sodium hydroxide in three aliquots. This caustic wash solution was added to the filtrate, which contained the soluble alpha-naphthoate. The precipitate was dissolved by passing about 200 ml. of water through the filter, leaving on the filter a small amount of metal hydroxides. The aqueous solution of beta-sodium naphthoate and the caustic solution of alpha-sodium naphthoate were each washed once with 100 ml. of benzene. After decantation of the benzene phase, the alpha-naphthoic acid was precipitated by adding sufficient concentrated chemically pure hydrochloric acid, about 210 ml. of 12 N acid, to render the solution acid to litmus paper. The precipitated alpha-naphthoic acid was recovered by filtration and dried. The yield was 6.88 g. of alpha-naphthoic acid melting in the range 157.5° to 160.5° C. In a similar manner, beta-naphthoic acid was precipitated from the benzene-washed aqueous solution by acidifying it with concentrated chemically pure hydrochloric acid, about 4 ml. of 12 N acid. The precipitate was recovered by filtration and dried. The yield was 7.23 g. of beta naphthoic acid melting in the range 184.0° to 185.0° C.

*Example 2*

A sample of chemically pure acids was prepared by thoroughly mixing 4 g. of alpha-naphthoic acid melting at 164° to 165.5° C. and 8 g. of beta-naphthoic acid melting at 188° to 189° C. The mixture was stirred for about 30 minutes with 200 ml. of an aqueous solution containing 20 weight percent of sodium hydroxide, then filtered, the beta-naphthoate being recovered as a precipitate. Acidification of the filtrate with 105 ml. of 12 N hydrochloric acid precipitated 3.76 g. of alpha-naphthoic acid melting in the range of 163° to 168° C. Infrared analysis showed that the product recovered was 97 percent alpha-naphthoic acid and 3 percent beta-naphthoic acid by weight. The caustic-insoluble beta-naphthoate was dissolved in 200 ml. of water, and the solution acidified with 5 ml. of 12 N hydrochloric acid. This precipitated 7.52 g. of beta-naphthoic acid melting in the range 188° to 189° C. Infrared analysis showed that the product recovered was 98 percent beta-naphthoic acid.

*Example 3*

A mixture of commercial naphthoic-acid isomers was prepared which contained 25 g. of alpha-naphthoic acid and 25 g. of beta-naphthoic acid. The alpha-naphthoic acid melted at 165.5° to 166° C., and infrared analysis indicated that this product contained 92 percent alpha-naphthoic acid and no detectable beta-naphthoic acid. The beta-naphthoic acid melted at 186.5° to 187.5° C., and infrared analysis indicated that this sample was 100 percent beta-naphthoic acid. The mixture melted at 134.5° to 140° C. Infrared analysis indicated that this mixture contained 48 percent alpha-naphthoic acid and 45 percent beta-naphthoic acid.

A 10-gram portion of this mixture was stirred for 30 minutes in 100 ml. of an aqueous solution containing 30 weight percent of potassium hydroxide. The solution was filtered and the beta-naphthoate recovered as a precipitate. The precipitate was washed five times with 20-ml. aliquots of 30 percent potassium-hydroxide solution, and the washings were added to the filtrate. Acidification of the filtrate with 102 ml. of 12 N hydrochloric acid precipitated 5.09 g. of alpha-naphthoic acid melting at 158° to 162° C. Infrared analysis showed that the product recovered was 85 percent alpha naphthoic acid and less than one percent beta-naphthoic acid. The caustic-insoluble beta-naphthoate was dissolved in 200 ml. of water, and the solution was acidified with 10 ml. of 12 N hydrochloric acid. This precipitated 4.50 g. of beta-naphthoic acid melting at 190° to 192° C. Infrared analysis showed that this product was 95 percent beta-naphthoic acid. No alpha-naphthoic acid was detected in this sample.

*Example 4*

Another 10-gram portion of the 50–50 mixture of naphthoic acids, prepared as described in Example 3, was stirred with 100 ml. of a 42.5 weight percent solution of potassium hydroxide (646 g. KOH per liter) and filtered as in Example 3. In this case, acidification of the potassium-hydroxide solution required 245 ml. of 12 N hydrochloric acid and no detectable precipitate of alpha-naphthoic acid was formed. The caustic-insoluble naphthoates were dissolved in 200 ml. of water, and the solution was acidified with 26 ml. of 12 N hydrochloric acid. This precipitated 9.82 g. of mixed naphthoic acids melting at 134° to 140° C. Infrared analysis indicated the product recovered contained 46 percent alpha-naphthoic acid and 49 percent beta-naphthoic acid. No separation of the isomers was obtained by the use of 42.5 weight percent potassium-hydroxide solution.

*Example 5*

Another 10-gram portion of the 50–50 mixture of naphthoic acids, prepared as described in Example 3, was stirred with 100 ml. of 19.5 weight percent potassium-hydroxide solution (231 g. KOH per liter) and processed as in Example 3. Acidification of the filtered potassium-hydroxide solution with 67 ml. of 12 N hydrochloric acid precipitated 7.13 g. of mixed naphthoic acids. The mixture recovered melted at 135° to 147° C., and it was found to contain 55 percent alpha-naphthoic acid and 28 percent beta-naphthoic acid by weight. The caustic-insoluble beta-naphthoate was dissolved in 200 ml. of water, and the solution was acidified with 10 ml. of 12 N hydrochloric acid. This precipitated 2.41 g. of beta-naphthoic acid melting at 190° to 195.5° C. Infrared analysis indicated that this product contained 97 percent beta-naphthoic acid and no detectable amount of alpha-naphthoic acid.

*Example 6*

Another 10-gram portion of the 50–50 mixture of naphthoic acids prepared as described in Example 3 was stirred with 110 mls. of an alkaline brine solution containing 3.56 g. sodium hydroxide, 26.8 g. sodium chloride and 97 g. water, i.e., 32 g. NaOH and 244 g. NaCl per liter. This solution was substantially saturated with sodium chloride. The resulting mixture was filtered. The insoluble beta-naphthoate was washed on the filter with five 20-ml. aliquots of fresh alkaline brine, and the washings were added to the filtrate. Acidification of the filtrate with 12.5 ml. of 12 N hydrochloric acid precipitated 5.04 g. of alpha-naphthoic acid melting at 160° to 165° C. Infrared analysis showed that the product recovered was 94 percent alpha-naphthoic acid and contained no detectable amount of beta-naphthoic acid. The insoluble beta-naphthoate was dissolved in 200 ml. of water, and this solution was acidified with 7 ml. of 12 N hydrochloric acid. This precipitated 4.57 g. of beta-naphthoic acid melting at 188.5° to 189° C. Infrared analysis of this product indicated that it was 95 percent beta-naphthoic acid, and no alpha-naphthoic acid was detected.

While the above examples illustrate preferred methods of operation, other conditions may be used without departing from the spirit of the invention.

For the initial conversion of naphthoic-acid isomers to naphthoates, I may use aqueous solutions of an alkali-metal hydroxide, an alkali-metal salt, such as one of the bicarbonates or carbonates, or an admixture of these hydroxides and/or salts. These materials in increasing concentrations will serve to precipitate from solution beta-naphthoates of alkali metals. For precipitation of the beta-naphthoates, concentrated solutions of other alkali-metal salts such as the halides, nitrates and sulphates may be used. It should also be understood that a mixture of alpha- and beta-naphthoates, whatever its origin, when contacted with a solution of an alkali-metal hydroxide, salt or admixture thereof, may be separated by selectively dissolving the alpha-naphthoate but not the beta-naphthoate. Where a crude naphthoic-acid reaction product is to be purified, neutral solvents such as benzene, hexane and chloroform may be used. For reprecipitation of naphthoic acids from the separated naphthoates any strong mineral acid such as hydrochloric, sulphuric, nitric, phosphoric and perchloric may be used.

The invention is characterized by distinct advantages. In the first place, the reactions are simple ones and the reagents that effect a separation of the acid isomers to substantially pure products are relatively inexpensive. Secondly, where stable, alkali-metal salts are used to precipitate beta-naphthoate from previously or concurrently formed alpha- and beta-naphthoates, the use of acid for reprecipitating the respective naphthoic acids is appreciably reduced, since these salts do not require neutralization. It is therefore possible to recirculate these salt solutions for reuse, after adding thereto a low, effective concentration of naphthoate-former or converter. For best results, it is desirable to add sufficient naphthoate converter such as sodium hydroxide to insure the presence in the solution of one stoichiometric equivalent of naphthoate converter per equivalent of naphthoic acid to be converted to naphthoate.

Although I have disclosed herein the preferred practice of my invention, I intend to cover as well any change or modification therein which may be made without departing from the spirit and scope of the invention.

I claim:

1. In a method of separating alpha-naphthoic acid from beta-naphthoic acid in a mixture thereof, the steps comprising converting the acids to naphthoates by adding thereto an aqueous solution of material selected from the group consisting of sodium and potassium hydroxide, bicarbonate, carbonate and admixtures thereof to provide at least one stoichiometric equivalent of said material per equivalent of naphthoic acid, said material being present in a concentration of up to about 3% by weight in said solution, then precipitating the beta-naphthoate from the solution by adding thereto a solute selected from the group consisting of sodium and potassium hydroxide, bicarbonate, carbonate, halide, nitrate, sulphate and admixtures thereof to a concentration of said solute between about 3% by weight and a saturated solution thereof, and filtering the beta-naphthoate precipitated thereby from the alpha-naphthoate remaining in solution.

2. A method of separating the alpha-naphthoate and the beta-naphthoate of an alkali metal chosen from the group consisting of sodium and potassium, from a mixed water solution thereof comprising dissolving in said solution material chosen from the group consisting of sodium and potassium hydroxide, bicarbonate, carbonate, halide, nitrate, sulphate and admixtures thereof until said material is present in a concentration between about 3% by weight of said material and a saturated solution thereof thereby to precipitate at least a portion of said beta-naphthoate present, and filtering the solution to recover said precipitate.

3. A method of separating alpha-naphthoic acid from beta-naphthoic acid in a mixture containing them, comprising stirring said mixture in an alkaline-brine solution containing about 32 grams sodium hydroxide and about 244 grams sodium chloride per liter of solution, filtering the stirred mixture, treating remaining filter cake with water until no further filter cake dissolves as a separate filtrate, acidifying the respective filtrates with concentrated hydrochloric acid and recovering precipitated alpha-naphthoic acid and beta-naphthoic acid respectively.

4. A method as in claim 3, characterized by stirring said mixture in an aqueous solution containing about 20 weight percent of sodium hydroxide.

5. A method as in claim 3, characterized by stirring said mixture in an aqueous solution containing about 30 weight percent potassium hydroxide.

No reference cited.

UNITED STATES PATENT OFFICE
CERTIFICATE OF CORRECTION

Patent No. 3,129,244 April 14, 1964

Thomas F. Johnson

It is hereby certified that error appears in the above numbered patent requiring correction and that the said Letters Patent should read as corrected below.

Column 1, line 10, for "naphtholic" read -- naphthoic --; column 4, line 61, for "195.5° C." read -- 190.5° C. --; column 5, line 37, after "by" insert -- several --.

Signed and sealed this 4th day of August 1964.

(SEAL)
Attest:

ERNEST W. SWIDER
Attesting Officer

EDWARD J. BRENNER
Commissioner of Patents